United States Patent
Kawakami et al.

[15] 3,682,992
[45] Aug. 8, 1972

[54] BORON-CONTAINING ORGANOTIN COMPOUNDS

[72] Inventors: Yohei Kawakami, Osaka-fu; Toshio Seki, Osaka-shi; Kozaburo Suzuki, Kobe-shi, all of Japan

[73] Assignee: Nitto Kasei Co., Ltd., Osaka, Japan

[22] Filed: Dec. 8, 1969

[21] Appl. No.: 880,449

Related U.S. Application Data

[62] Division of Ser. No. 700,698, Jan. 26, 1968, Pat. No. 3,539,529.

[52] U.S. Cl. ............. 260/414, 260/45.75, 260/429.7
[51] Int. Cl. ........................................... C08h 17/36
[58] Field of Search ....................... 260/414, 429.7

[56] References Cited

UNITED STATES PATENTS

| | | | |
|---|---|---|---|
| 2,904,569 | 9/1969 | Ramsden | 260/429.7 |
| 2,904,570 | 9/1969 | Ramsden | 260/429.7 |

*Primary Examiner*—Lewis Gotts
*Assistant Examiner*—Ethel G. Love
*Attorney*—Carl G. Seutter and Lewis C. Brown

[57] ABSTRACT

Novel compositions and a stabilized polyvinyl chloride resin composition comprising essentially, in a predominant amount, a polyvinyl chloride resin and, in a small amount, at least one boron-containing organotin compound having the formula

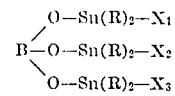

wherein R is a member selected from the group consisting of alkyl alkenyl, aralkyl, alkylaryl and aryl; $X_1$ is a member selected from the group consisting of the residues of monomercapto compounds, dimercapto compounds and polymercapto compounds, said residues containing at least one free sulfhydryl radical; and $X_2$ and $X_3$ are members selected from the group consisting of hydroxyl, the same residues as $X_1$, the residues of carboxylic acids and maleic acid monoesters, and the residues of mercapto compounds containing no free sulfhydryl radical.

20 Claims, No Drawings

BORON-CONTAINING ORGANOTIN COMPOUNDS

This is a division of application Serial No. 700,698, filed January 26, 1968, now U. S. patent No. 3539529.

This invention relates to the stabilization of polyvinyl chloride resins against light and heat using certain novel boron-containing organotin compounds. Various stabilizers have been used in the past in the treatment for stabilizing against light and heat polyvinyl chloride (PVC) and the copolymeric resins predominantly thereof. These stabilizers however are as yet unsatisfactory with respect to heat and light resistance. In addition, they are undesirable in that because these stabilizers volatilize and spatter during the heat treatment such as calendering, extruding or moulding of the PVC resins they are a health hazard to the worker.

As a result of having engaged in extensive researches for a stabilizer having better resistance to heat and light than the conventional stabilizers and because of its low volatility would hardly volatilize or spatter during the heat treatment of the foregoing resins so as to a health hazard to the worker, we found that a boron compound having through the intermediary of an organotin at least one sulfhydryl radical (SH radical) in its molecules was very valuable as a stabilizer.

Accordingly, an object of the present invention is to provide a stabilizer having low volatility which is valuable for stabilizing the PVC resins against light and heat. Another object is to provide stabilized PVC resin compositions by means of the use of the foregoing stabilizer.

The foregoing objects of the invention are achieved by the incorporation in the PVC resins in a small amount of at least one boron-containing organotin compound having the formula

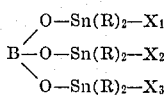

wherein R is a member selected from the group consisting of alkyl, alkenyl, aralkyl, alkylaryl and aryl; $X_1$ is a member selected from the group consisting of the residues of monomercapto compounds, dimercapto compounds, and polymercapto compounds, said residues containing at least one free sulfhydryl radical; and $X_2$ and $X_3$ are members selected from the group consisting of hydroxyl, the same residues as $X_1$, the residues of carboxylic acid and maleic acid monoesters, and the residues of mercapto compounds containing no free sulfhydryl radical.

Preferred for R are alkyl radicals of one to 18 carbon atoms, particularly methyl, ethyl, propyl, butyl, amyl and octyl radicals, and phenyl radical or benzyl radical. As $X_1$ are used, the residues of the monomercapto compounds of divalent hydrocarbon radicals having two to 20 carbon atoms such as mercapto acids, e.g., thioglycollic acid, mercaptopropionic acid, thiomalic acid and thiosalicylic acid; the ester of mercapto alcohol and dibasic carboxylic acid, e.g., monomercaptoethyl maleate (HOOCCH = CHCOOCH$_2$CH$_2$SH), monomercaptoethyl phthalate (HOOCC$_6$H$_4$COOCH$_2$CH$_2$SH) and monomercaptoethyl adipate (HOOCCH$_2$CH$_2$CH$_2$CH$_2$COOCH$_2$CH$_2$SH); the dibasic carboxylic acid and mercapto acid ester of glycol, e.g., ethylene glycol maleate thioglycolate (HOOCCH = CHCOOCH$_2$CH$_{2d6}$$^{OOCCH_2}$SH), ethylene glycol phthalate thioglycolate (HOOCC$_6$H$_4$COOCH$_2$CH$_2$OOCCH$_2$SH), ethylene glycol succinate thioglycolate (HOOCCH$_2$CH$_2$COOCH$_2$CH$_2$OOCCH$_2$SH), ethylene glycol maleate mercaptopropionate (HOOCCH = CHCOOCH$_2$CH$_{2d6}$$^{OOCCH_2}$CH$_2$SH), diethylene glycol maleate mercaptopropionate (HOOCCH = CHCOOCH$_2$CH$_{2d6}$$^{OCH_2}$CH$_2$OOCCH$_2$CH$_2$SH), triethylene glycol maleate mercaptopropionate (HOOCCH = CHCOOCH$_2$CH$_2$OCH$_2$CH$_2$OOCCH$_2$CH$_2$SH), propylene glycol maleate thioglycolate (HOOCCH = CHCOOCHCH$_3$CH$_2$OOCCH$_2$SH), propylene glycol succinate mercaptopropionate (HOOCCH$_2$CH$_2$COOCHCH$_3$CH$_2$OOCCH$_2$CH$_2$SH), and dipropylene glycol phthalate mercaptopropionate (HOOCC$_6$H$_4$OOCHCH$_3$CH$_2$OCHCH$_3$CH$_2$OOCCH$_2$CH$_2$SH). Further, also used are the residues of dimercapto compounds of 2-20 carbon atoms such as dimercaptans, e.g., ethylene dimercaptan, 1,2-propylene dimercaptan, 1,4-tetramethylene dimercaptan, dimercaptoethyl ether, α,α'-dimercapto-p-xylene; the esters of mercapto alcohol and mercapto acid, e.g., mercaptoethyl thioglycolate (HSCH$_2$CH$_2$OOCCH$_2$SH), and mercaptoethyl mercaptopropionate (HSCH$_2$CH$_2$OCCH$_2$CH$_2$SH); the esters of mercapto alcohol and dibasic carboxylic acid, e.g., dimercaptoethyl maleate (HSCH$_2$CH$_2$OOCCH = CHCOOCH$_2$CH$_2$SH), dimercaptoethyl phthalate (HSCH$_2$CH$_2$OOCC$_6$H$_4$COOCH$_2$CH$_2$SH), and dimercaptoethyl itaconate (HSCH$_2$CH$_2$OOCCH$_2$CH$_2$COOCH$_2$CH$_2$SH); the esters of glycol and mercapto acid, e.g., ethylene glycol dithioglycolate (HSCH$_2$COOCH$_2$CH$_2$OOCCH$_2$SH), propylene glycol dithioglycolate (HSCH$_2$COOCHCH$_{32}$OOCCH$_2$SH), diethylene glycol dimercaptopropionate (HSCH$_2$CH$_2$COOCH$_2$CH$_2$OCH$_2$H$_2$OOCCH$_2$CH$_2$SH), triethylene glycol dithioglycolate (HSCH$_2$COOCH$_2$CH$_2$OCH$_2$CH$_2$OCH$_2$CH$_2$OOCCH$_2$SH), dipropylene glycol dimercaptopropionate (HSCH$_2$CH$_2$COOCHCH$_3$CH$_3$OCHCH$_3$CH$_2$OOCCH$_2$CH$_2$SH) ethylene glycol dimercaptopropionate (HSCH$_2$CH$_2$COOCH$_2$CH$_2$OOCCH$_2$CH$_2$SH), and propylene glycol dimercaptopropionate (HSCH$_2$CH$_2$OOCHCH$_3$CH$_2$OOCCH$_3$CH$_2$SH); and polythiodimercaptan obtained by reacting sodium disulfide with a mixture of 98 mole percent of bis(2chloroethyl)-formal and 2 mole percent of trichloropropane, e.g., HS(CH$_2$CH$_2$OCH$_2$OCH$_2$CH$_2$SS)$_3$CH$_2$OCH$_2$OCH$_2$CH$_2$SH. Further, also used are the residues of polymercapto compounds of two to 20 carbon atoms e.g., glycerin trithioglycolate, glycerin trimercaptopropionate, and trithioglycerol. As $X_2$ and $X_3$, besides the same residues as those of $X_1$, usable are also the residues of octyl acid, lauric acid, stearic acid, maleic acid, oleic acid, benzoic acid, monobutylmaleate, monooctymaleate, monocetylmaleate, monobenzylmaleate, lauryl mercaptan, thioglycollic acid, mercaptopropionic acid, hexylthioglycolate, butylmercaptopropionate, mercaptoethanol, mercaptoethyl acetate and mercaptoethyl laurate.

The chemical structures of the typical stabilizers, which are valuable in the present invention, are illustrated by means of the following formulas (1)–(10), wherein R, R', R'' and R''' are respectively methyl (CH$_3$), butyl (C$_4$H$_9$), octyl (C$_8$H$_{17}$), and phenyl (C$_6$H$_5$) groups.

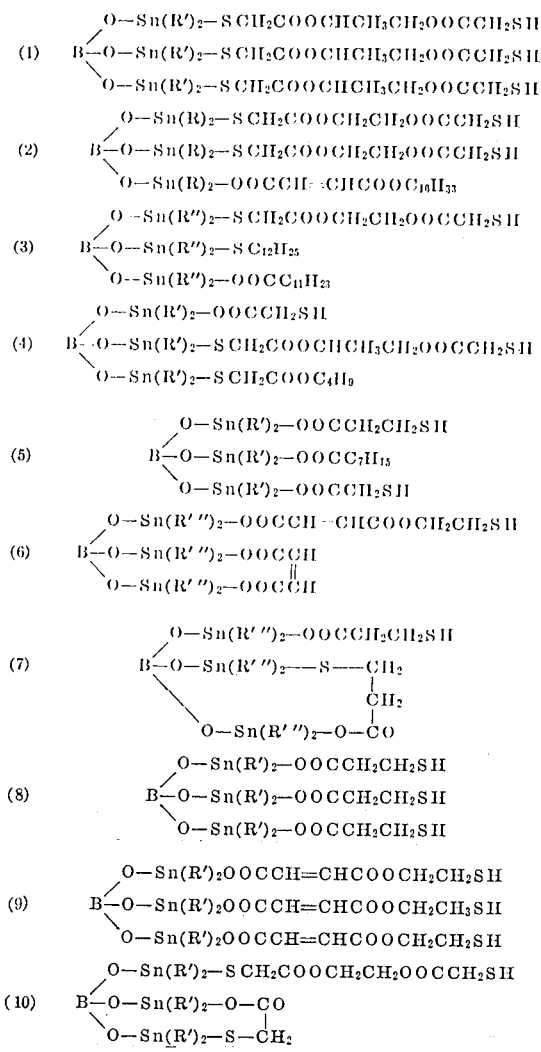

As regards the process for producing these boron-containing organotin compounds, the compound of formula (1) can be obtained, for example, by reacting 1 mole of boric acid, 3 moles of dibutyltin oxide and 3 moles of propylene glycol dithioglycolate.

The hereinbefore presented examples as well as the other boron-containing organotin compounds to be used in the present invention exhibit remarkable effectiveness in stabilizing the polyvinyl chloride resins and hence impart to these resins particularly good resistance to heat and light. In addition, since they are substances having very low volatility, they are very convenient from the standpoint of health management, as they do not have an adverse effect on the human body. While these stabilizers are productive of results with very small amounts, they are normally used suitably in an amount of 0.1–10 parts by weight per 100 parts by weight of the polyvinyl chloride resins. These stabilizers can be used either singly or as mixtures. They can also be used conjointly with the conventional stabilizers, antioxidants or ultra violet absorbers.

The stabilizer compounds which are valuable in this invention are those which contain in their molecules, as indispensable components, the three components of an organotin, a sulfhydryl radical and boron. The other radicals making up the molecules essentially have no effect on the effectiveness of the present invention. The fact that satisfactory results cannot be obtained if any one of the foregoing three indispensable components is missing will be illustrated by the hereinafter given examples. From this fact, it is presumed that the surprising improvements in the resistance to heat and light which are imparted by the invention stabilizer are the result of the superior synergistic effects of these components that are contained in the molecules.

The polyvinyl chloride resins to which the present invention is applicable include the PVC homopolymeric resins, the copolymeric resins predominantly of PVC, and the blends of these resins with other resins. Accordingly, polyvinyl chloride resin in the specification and claims includes all of the aforesaid resins. These resins may also contain the customary fillers, coloring agents and other additives.

EXAMPLES 1 – 14

The previously mentioned boron-containing organotin compounds of the present invention having the formulas (1)–(10) were separately added in amounts of 2 parts by weight to 100 parts by weight of PVC ($\bar{P}$ = 1,100), followed by milling for 5 minutes on a mixing roll at 160°±2°C. The resulting sheets were tested for their resistance to heat by means of a color tone change test in a Geer oven at 180°C., and for their resistance to light by means of a color tone change test using an ultra violet light source of 2,537 A.

By way of comparison, tests entirely the same as those described above were carried out using the compounds having the following formulas (11)–(13) which we synthesized:

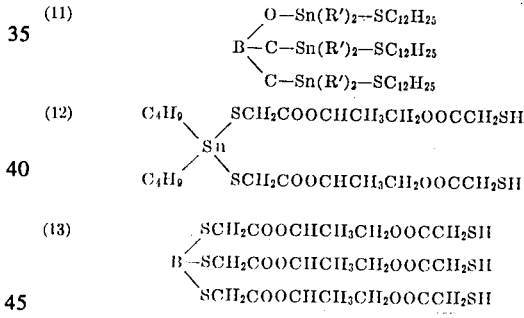

and a compound of the following formula (14), a known sulfur type stabilizer:

(14)    

The results of color change of PVC by means of these tests, as observed with the passage of time, are shown in Table I.

TABLE I

| Stabilizer (formula) | Resistance to Heat Test | | | | Resistance to Light test |
|---|---|---|---|---|---|
| | After 0.5 hr. | After 1.0 hr. | After 1.5 hrs. | After 2.0 hrs. | After 48 hrs. |
| (1) | colorless | colorless | colorless | light yellow | colorless |
| (2) | do | do | light yellow | yellow | do |
| (3) | do | do | do | do | do |
| (4) | do | do | do | light yellow | do |
| (5) | do | do | do | yellow | do |

| | | | | | |
|---|---|---|---|---|---|
| (6) | do | do | colorless | light yellow | do |
| (7) | do | do | light yellow | yellow | do |
| (8) | do | do | colorless | light yellow | do |
| (9) | do | do | do | do | do |
| (10) | do | do | light yellow | yellow | do |
| (11)* | do | light yellow | light yellow | light brown | light brown |
| (12)* | light yellow | yellow | light brown | brown | brown |
| (13)* | colorless | light brown | brown | black | black |
| (14)* | colorless | light yellow | yellow | light brown | brown |

*Controls

As the changes in the color tone of PVC which attend its decomposition by heat and light take the course of colorless → light yellow → yellow → light brown → brown → black, it is apparent from the foregoing results that the stabilizing effects that are obtained by the invention stabilizers are truly remarkable.

Next, for testing the volatility of each of the stabilizers, the several stabilizers were measured for their weight change after heating them for 1 hour at 180°C. As a result, the following decrease in weights occurred in the respective stabilizers: (1) 0.5%, (2) 0.8%, (3) 0.4%, (4) 0.2%, (5) 0.2%, (6) 0.4%, (7) 0.6%, (8) 0.3%, (9) 0.5%, (10) 0.2%, (11) 1.8%, (12) 5.0%, (13) 4.5%, (14) 3.0%. These results indicate the remarkable smallness of the volatilities of the invention stabilizers. This means not only that the problem which has a great bearing on health hazards during heat treatment is solved but also that the offensive odor characteristic of the sulfur type stabilizers is alleviated. While in the case of the stabilizer of formula (1) the decrease in weight was 0.5 percent, that of the stabilizer of formula (14) was 3.0 percent. The PVC to which was added as the stabilizer that of formula (1) did not give off during treatment the offensive odor characteristic of the mercaptans.

EXAMPLE 15-16

1 mole of boric acid, 3 moles of dibutyltin oxide, 2 moles of dimercaptoethyl maleate and 1 mole of lauric acid were reacted to yield a compound having the following formula (15).

(15)
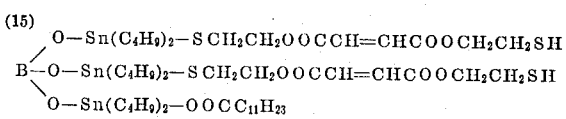

By way of comparison, a sulfur type stabilizer having the following formula (16) was used.

(16)
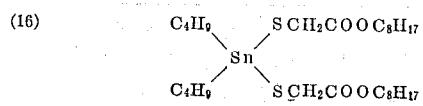

Three parts by weight of each of these two classes of stabilizers were added respectively to 100 parts by weight of a vinyl chloride-vinyl acetate copolymer and after milling for 5 minutes on a mixing roll at 150°±2°C. the mixtures were made into sheets. Tests for resistance to heat and light were conducted, as described in Examples 1-14, with the results shown in Table II.

TABLE II

| Stabilizer (formula) | Resistance to Heat Test | | | | Resistance to Light Test |
|---|---|---|---|---|---|
| | After 0.5 hr. | After 1.0 hr. | After 1.5 hrs. | After 2.0 hrs. | After 48 hrs. |
| (15) | colorless | colorless | colorless | light yellow | colorless |
| (16)* | do | do | light yellow | light yellow | light brown |

*Control

When the changes in weight were measured in the volatility test after heating the stabilizers for 1 hour at 180°C. in a Geer oven, the decrease in weight of stabilizer (15) was 0.8 percent while that of stabilizer (16) was 3.5 percent.

During the treatment when stabilizer (15) was added there was no offensive odor characteristic of the mercaptans.

EXAMPLE 17-18

A compound of the following formula (17) was obtained by reacting 1 mole of boric acid, 3 moles of dioctyltin oxide, 1 mole of ethylene glycol dithioglycolate and 2 moles of lauryl mercaptan.

(17)
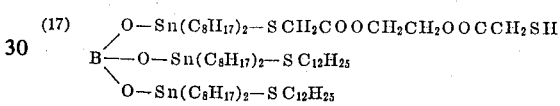

For comparison, the previously mentioned known sulfur type stabilizer (14) was used. Two parts by weight of each of these two classes of stabilizers were added respectively to 100 parts by weight of a vinyl chloride-vinylidene chloride popolymer and after milling for 5 minutes on a mixing roll the mixtures were made into sheets. The tests for resistance to heat and light were conducted, as described in Examples 1-14, with the results shown in Table III.

TABLE III

| Stabilizer (formula) | Resistance to Heat Test | | | | Resistance to Light Test |
|---|---|---|---|---|---|
| | After 0.5 hr. | After 1.0 hr. | After 1.5 hrs. | After 2.0 hrs. | After 48 hrs. |
| (17) | colorless | colorless | colorless | light yellow | colorless |
| (14)* | do | light yellow | yellow | light brown | brown |

*Control

When the changes in weight were measured in the volatility test after heating the stabilizers for 1 hour in a Geer oven at 180°C. the weight decrease of stabilizer (17) was 0.4 percent while that of stabilizer (14) was 3.0 percent.

EXAMPLE 19-20

A compound of the following formula (18) was obtained by reacting 1 mole of boric acid, 3 moles of dimethyltin oxide, 1 mole of propylene glycol dithioglycolate, 1 mole of monobenzyl maleate and 1 mole of lauric acid.

(18)
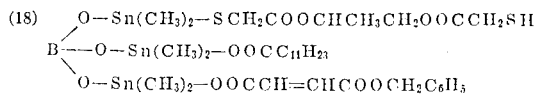

For comparison, the previously mentioned known sulfur type stabilizer (14) was used. Three parts of each of these two classes of stabilizers were added respectively to 100 parts by weight of PVC in which had been admixed 5 percent by weight of a styrene-acrylonitrile copolymer. The mixtures where then milled for 5 minutes on a mixing roll at 160°±2°C. and made into sheets. The same tests for resistance to heat and light, as described in Examples 1–14, were conducted with the results shown in Table IV.

TABLE IV

| Stabilizer (formula) | Resistance to Heat Test | | | | Resistance to Light Test |
|---|---|---|---|---|---|
| | After 0.5 hr. | After 1.0 hr. | After 1.5 hrs. | After 2.0 hrs. | After 48 hrs. |
| (18) | colorless | colorless | light yellow | light yellow | colorless |
| (14)* | do | light yellow | yellow | light brown | brown |

*Control

In the volatility test in which the changes in weight were measured after heating the stabilizers for 1 hour in a Geer oven at 180°C. the decrease in weight of stabilizer (18) was 0.2 percent whereas that of stabilizer (14) was 3.0 percent.

EXAMPLES 21–22

1 mole of boric acid, 3 moles of diphenyltin oxide, 1 mole of thioglycollic acid and 1 mole of maleic acid were reacted to yield a compound of the following formula (19).

(19)
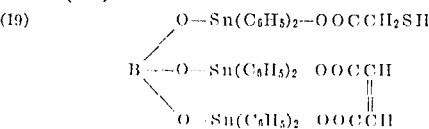

For comparison, a known sulfur type stabilizer of the following formula (20) was used.

(20)
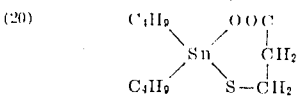

Three parts by weight of each of these two classes of stabilizers were added respectively to 100 parts by weight of PVC in which had been admixed 10 percent by weight of chlorinated polyethylene. The mixtures were milled for 5 minutes on a mixing roll at 150°±2°C. The same tests for resistance to heat and light, as described in Examples 1–14, were conducted with the results shown in Table V.

TABLE V

| | Resistance to Heat Test | | | | Resistance to Light Test |
|---|---|---|---|---|---|
| Stabilizer (formula) | After 0.5 hr. | After 1.0 hr. | After 1.5 hrs. | After 2.0 hrs. | After 48 hrs. |
| (19) | colorless | colorless | light yellow | yellow | colorless |
| (20)* | light yellow | yellow | light brown | brown | brown |

*Control

When the volatility test was conducted, the measurement of the changes in weight being made after heating the stabilizers for 1 hour in a Geer oven at 180°C. stabilizer (19) showed a weight decrease of 0.2 percent whereas that of stabilizer (20) was 1.0 percent.

The following Examples 23–36 illustrate typical methods of preparing a novel stabilizing compounds of the invention.

EXAMPLE 23

62 gms. boric acid (1 mole), 750 gms. dibutyltin oxide (3 moles), 673 gms. propylene glycol dithioglycolate (3 moles), 1,000 ml of benzene, and 300 ml. of ethyl alcohol were stirred and heated under reflux until all the water of reaction was removed (for 3.5 hours). After the reaction was complete, the reaction mixture was filtered, and the solvents were distilled off under reduced pressure to give the compound:

(1)
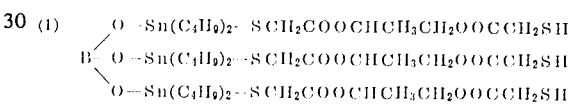

The yield of the product was 1,385 gms. (98.9 percent).

EXAMPLE 24

62 gms. boric acid (1 mole), 495 gms. dimethyltin oxide (3 moles), 420 gms. ethylene glycol dithioglycolate (2 moles), 341 gms. monocetylmaleate (1 mole), 1,000 ml. of benzene, and 300 ml. of ethyl alcohol were stirred and heated under reflux until all the water of reaction was removed (for 3 hours). After the reaction was complete, the reaction mixture was filtered, and the solvents were distilled off under reduced pressure to give the compound:

(2)
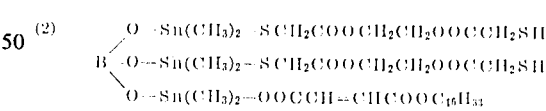

The yield of the product was 1,200 gms. (97.3 percent).

EXAMPLE 25

62 gms. boric acid (1 mole), 1,083 gms. dioctyltin oxide (3 moles), 210 gms. ethylene glycol dithioglycolate (1 mole), 202 gms. lauryl mercaptane (1 mole), 200 gms. lauric acid (1 mole), 1,000 ml. of benzene, and 300 ml. of ethyl alcohol were stirred and heated under reflux until all the water of reaction was removed (for 3.5 hours). After the reaction was complete, the reaction mixture was filtered, and the solvents were distilled off under reduced pressure to give the compound:

(3) 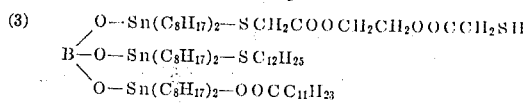

The yield of the product was 1,648 gms. (98.5 percent).

EXAMPLE 26

62 gms. boric acid (1 mole), 750 gms. dibutyltin oxide (3 moles), 92 gms. thioglycollic acid (1 mole), 224 gms. propylene glycol dithioglycolate (1 mole), 148 gms. butylthioglycolate (1 mole), 1,000 ml. of benzene, and 300 ml. of ethyl alcohol were stirred and heated under reflux until all the water of reaction was removed (for 3.5 hours). After the reaction was complete, the reaction mixture was filtered, and the solvents were distilled off under reduced pressure to give the compound:

(4) 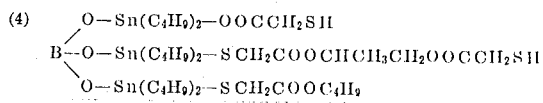

The yield of the product was 1,175 gms. (98.6 percent).

EXAMPLE 27

62 gms. boric acid (1 mole), 750 gms. dibutyltin oxide (3 moles), 202 gms. mercaptopropionic acid (1 mole), 92 gms. thioglycollic acid (1 mole), 144 gms. octyl acid (1 mole), 1,000 ml. of benzene, and 300 ml. of ethyl alcohol were stirred and heated under reflux until all the water of reaction was removed (for 3 hours). After the reaction was complete, the reaction mixture was filtered, and the solvents were distilled off under reduced pressure to give the compound:

(5) 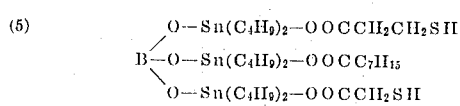

The yield of the product was 1,110 gms. (95.2 percent).

EXAMPLE 28

62 gms. boric acid (1 mole), 867 gms. diphenyltin oxide (3 moles), 176 gms. monomercaptoethyl maleate (1 mole), 116 gms. maleic acid (1 mole), 1,000 ml. of benzene, and 300 ml. of ethyl alcohol were stirred and heated under reflux until all the water of reaction was removed (for 3 hours). After the reaction was complete, the reaction mixture was filtered, and the solvents were distilled off under reduced pressure to give the compound:

(6) 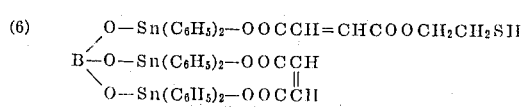

The yield of the product was 1,094 gms. (96.2 percent).

EXAMPLE 29

62 gms. boric acid (1 mole), 876 gms. diphenyltin oxide (3 moles), 404 gms. mercaptopropionic acid (2 moles), 1,000 ml. of benzene, and 300 ml. of ethyl alcohol were stirred and heated under reflux until all the water of reaction was removed (for 3.5 hours). After the reaction was complete, the reaction mixture was filtered and the solvents were distilled off under reduced pressure to give the compound:

(7) 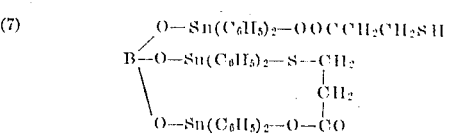

The yield of the product was 1,207 gms. (96.0 percent).

EXAMPLE 30

62 gms. boric acid (1 mole), 750 gms. dibutyltin oxide (3 moles), 606 gms. mercaptopropionic acid (3 moles), 1,000 ml. of benzene, and 300 ml. of ethyl alcohol were stirred and heated under reflux until all the water of reaction was removed (for 3 hours). After the reaction was complete, the reaction mixture was filtered, and the solvents were distilled off under reduced pressure to give the compound:

(8) 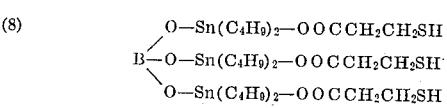

The yield of the product was 1,275 gms. (95.6 percent).

EXAMPLE 31

62 gms. boric acid (1 mole), 750 gms. dibutyltin oxide (3 moles), 528 gms. monomercaptoethyl maleate (3 moles), 1,000 ml. of benzene, and 300 ml. of ethyl alcohol were stirred and heated under reflux until all the water of reaction was removed (for 3 hours). After the reaction was complete, the reaction mixture was filtered, and the solvents wee distilled off under reduced pressure to give the compound:

(9) 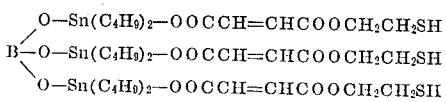

The yield of the product was 1,203 gms. (95.8 percent).

EXAMPLE 32

62 gms. boric acid (1 mole), 750 gms. dibutyltin oxide (3 moles), 210 gms. ethylene glycol dithioglycolate (1 mole), 92 gms. thioglycollic acid (1 mole), 1,000 ml. of benzene, and 300 ml. of ethyl alcohol were stirred and heated under reflux until all the water of reaction was removed (for 3.5 hours). After the reaction was complete, the reaction mixture was filtered, and the solvents were distilled off under reduced pressure to give the compound:

(10)
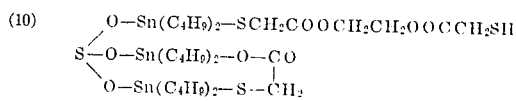

The yield of the product was 1,003 gms. (97.4 percent).

EXAMPLE 33

62 gms. boric acid (1 mole), 750 gms. dibutyltin oxide (3 moles), 473 gms. dimercaptoethyl maleate (2 moles), 200 gms. lauric acid (1 mole), 1,000 ml. of benzene, and 300 ml. of ethyl alcohol were stirred and heated under reflux until all the water of reaction was removed (for 3 hours). After the reaction was complete, the reaction mixture was filtered, and the solvents were distilled off under reduced pressure to give the compound:

(15)
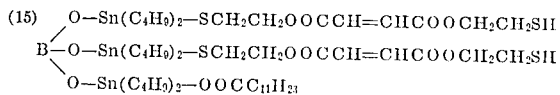

The yield of the product was 1,350 gms. (96.4 percent).

EXAMPLE 34

62 gms. boric acid (1 mole), 1,083 gms. dioctyltin oxide (3 moles), 210 gms. ethylene glycol dithioglycolate (1 mole), 404 gms. dodecyl mercaptide (2 moles), 1,000 ml. of benzene, and 300 ml. of ethyl alcohol were stirred and heated under reflux until all the water of reaction was removed (for 3.5 hours). After the reaction was complete, the reaction mixture was filtered, and the solvents were distilled off under reduced pressure to give the compound:

(17)
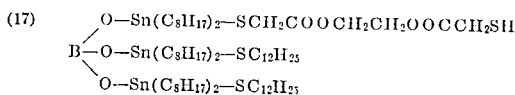

The yield of the product was 1,650 gms. (98.5 percent).

EXAMPLE 35

62 gms. boric acid (1 mole), 495 gms. dimethyltin oxide (3 moles), 224 gms. propylene glycol dithioglycolate (1 mole), 206 gms. benzyl maleate (1 mole), 200 gms. lauric acid (1 mole), 1,000 ml. of benzene and 300 ml. of ethyl alcohol were stirred and heated under reflux until all the water of reaction was removed (for 3.5 hours). After the reaction was complete, the reaction mixture was filtered, and the solvents were distilled off under reduced pressure to give the compound:

(18)
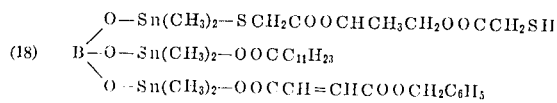

The yield of the product was 1,090 gms. (98.8 percent).

EXAMPLE 36

62 gms. boric acid (1 mole), 867 gms. diphenyltin oxide (3 moles), 92 gms. thioglycolic acid (1 mole), 98 gms. maleic anhydride (1 mole), 1,000 ml. of benzene, and 300 ml. of ethyl alcohol were stirred and heated under reflux until all the water of reaction was removed (for 3 hours). After the reaction was complete, the reaction mixture was filtered, and the solvents were then distilled off under reduced pressure to give the compound:

(19)
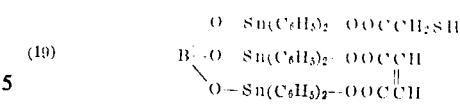

The yield of the product was 988 gms. (95.5 percent).

Although this invention has been illustrated by reference to specific embodiments, modifications thereof which are clearly within the scope of the invention will be apparent to those skilled-in-the-art.

We claim:

1. A boron-containing organotin compound having the formula

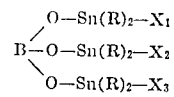

wherein R is a member selected from the group consisting of alkyl, alkenyl, aralkyl, alkylaryl and aryl; $X_1$ is a member selected from the group consisting of the residues of monomercapto compounds, dimercapto compounds and polymercapto compounds, said residues containing at least one free sulfhydryl radical; and $X_2$ nd $X_3$ are members selected from the group consisting of hydroxyl, the same residues as $X_1$, the residues of carboxylic acids and maleic acid monoesters, and the residues of mercapto compounds containing no free sulfhydryl radical.

2. A compound as claimed in claim 1 wherein each R is an alkyl radical of one to 18 carbon atoms.

3. A compound as claimed in claim 1 wherein $X_1$ is the residue of a monomercapto compound of two to 20 carbon atoms.

4. A compound as claimed in claim 1 wherein each R is an alkyl radical of one to 18 carbon atoms, $X_1$ is the residue of a monomercapto compound of two to 20 carbon atoms, and $X_2$ and $X_3$ are residues of a carboxylic acid monoester.

5. A compound of the formula

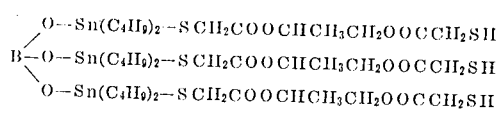

6. A compound of the formula

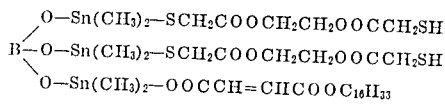

7. A compound of the formula

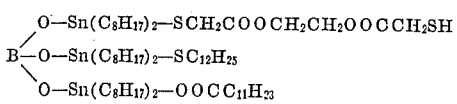

8. A compound of the formula

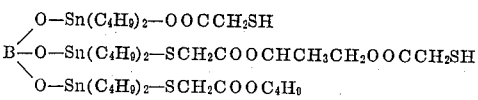

9. A compound of the formula

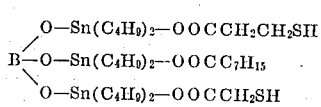

10. A compound of the formula

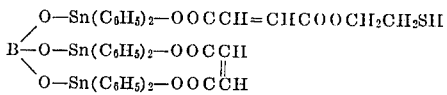

11. A compound of the formula

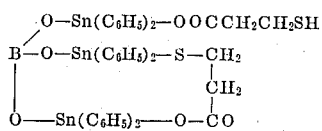

12. A compound of the formula

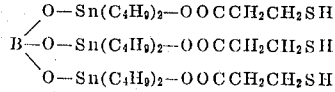

13. A compound of the formula

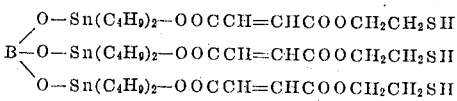

14. A compound of the formula

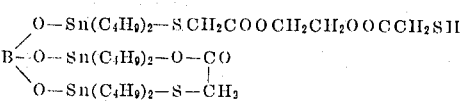

15. A compound of the formula

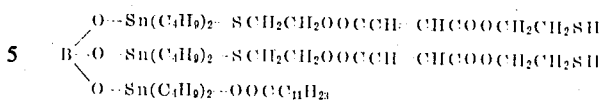

16. A compound of the formula

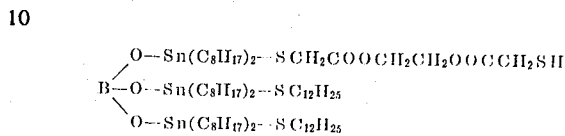

17. A compound of the formula

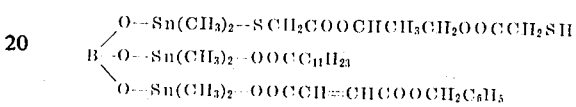

18. A compound of the formula

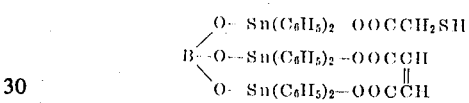

19. A process for preparing a boron-containing organotin compound which comprises combining a) boric acid, b) an organotin oxide of the formula $R_2SnO$ wherein R is selected from the group consisting of alkyl, alkenyl, aralkyl, alkaryl and aryl hydrocarbon radicals, and c) a mono- or dimercaptan exhibiting a generic formula selected from the group consisting of

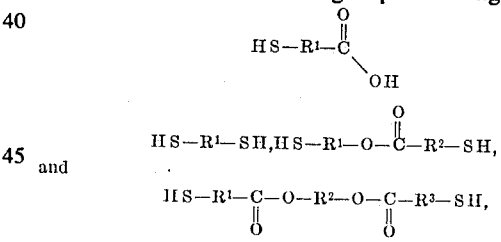

and

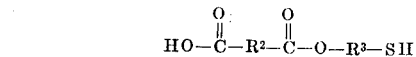

wherein $R^1$, $R^2$ and $R^3$ are independently

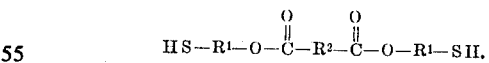

selected from divalent hydrocarbon radicals containing between two and 20 carbon atoms, with the proviso that the mono- or dimercaptan contains not more than 20 carbon atoms, to form a reaction mixture and separating the boron-containing organotin compound from said reaction mixture.

20. The process of claim 19 wherein a monoester of maleic acid containing up to 20 carbon atoms is included in the reaction mixture.

* * * * *